US008196140B2

(12) United States Patent
Miskelly et al.

(10) Patent No.: US 8,196,140 B2
(45) Date of Patent: Jun. 5, 2012

(54) SERVICE FUNCTION REDIRECTION FOR AVOIDING FUNCTION EVALUATION BLOCKAGES

(75) Inventors: Gregg B. Miskelly, Seattle, WA (US); Azeemullah Khan, Kirkland, WA (US); Jonathan Michael Stall, Bothell, WA (US); Paul Matthew Pietrek, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/972,720

(22) Filed: Jan. 11, 2008

(65) Prior Publication Data
US 2009/0183154 A1 Jul. 16, 2009

(51) Int. Cl.
G06F 9/46 (2006.01)
(52) U.S. Cl. ............. 718/100; 718/1; 717/125; 717/129
(58) Field of Classification Search .................. None
See application file for complete search history.

(56) References Cited

U.S. PATENT DOCUMENTS

| | | | |
|---|---|---|---|
| 5,632,032 A | | 5/1997 | Ault et al. |
| 5,845,117 A | * | 12/1998 | Fujita ............................ 718/107 |
| 6,681,384 B1 | | 1/2004 | Bates et al. |
| 6,779,187 B1 | | 8/2004 | Hammond |
| 6,826,746 B2 | | 11/2004 | Evans et al. |
| 7,162,664 B2 | | 1/2007 | Haselden et al. |
| 2002/0026534 A1 | * | 2/2002 | Buzbee et al. ................. 709/318 |
| 2002/0099755 A1 | * | 7/2002 | Kubooka et al. .............. 709/101 |
| 2005/0240906 A1 | * | 10/2005 | Kinderknecht et al. ...... 717/136 |
| 2006/0101468 A1 | | 5/2006 | Massarenti et al. |
| 2006/0174225 A1 | | 8/2006 | Bennett et al. |
| 2007/0011515 A1 | * | 1/2007 | Heydarian et al. ............ 714/724 |
| 2007/0220513 A1 | * | 9/2007 | Hwang .............................. 718/1 |
| 2008/0209422 A1 | * | 8/2008 | Coha .............................. 718/102 |

OTHER PUBLICATIONS

Dependency Isolation for Thread-based Multi-tier Internet Services Lingkun Chu, Kai Shen, Hong Tang, Tao Yang, and Jingyu Zhou Department of Computer Science University of California, document 2003-29 Published: Oct. 2003.*
Debugging Applications for Microsoft .NET and Microsoft Windows John Robbins Microsoft Press, pages: title, copyright, 193-208 Published: 2003.*
"Func-eval is evil" http://blogs.msdn.com/jmstall/archive/2005/03/23/400794.aspx.
"Improving the reliability of the Visual Studio debugger on managed code (aka FuncEval is evil)" http://blogs.msdn.com/andypennell/archive/2004/02/13/72617.aspx.
"How can I tell if I am being called from funceval", http://www.codeprof.com/dev-archive/77/12-868-771863.shtm. "Detours", http://research.microsoft.com/sn/detours/.
Hunt, et al. "Detours: Binary Interception of Win32 Functions", Published in Proceedings of the 3rd USENIX Windows NT, Symposium. Seattle, WA, Jul. 1999. pp. 1-9.

* cited by examiner

Primary Examiner — Emerson Puente
Assistant Examiner — Paul Mills
(74) Attorney, Agent, or Firm — Microsoft Corporation

(57) ABSTRACT

Threads operating in a computing environment often invoke service functions, such as methods of a programming library. Such invocations may sometimes cause a blocking of the thread, which may be protracted. A long pendency of the service function invocation and blocking of the thread may be acceptable in some operating contexts, such as the ordinary processing of the thread, but may be unacceptable in other operating contexts, such as while performing a function evaluation during debugging. Such blocking may be mitigated by redirecting a service function to an abort function if the service function is capable of blocking the thread and the thread is operating in a safe mode. The thread may then be permitted to execute, and the potentially blocking service functions may be avoided, resulting in a function evaluation abort (e.g., an exception) rather than a blocked thread and a failed debugging scenario.

20 Claims, 5 Drawing Sheets

SERVICE FUNCTION REDIRECTION FOR AVOIDING FUNCTION EVALUATION BLOCKAGES

BACKGROUND

In computing environments, executing programs comprise one or more threads of execution that perform various tasks. In the performance of such tasks, the threads may utilize resources and invoke functions stored outside the context of the thread, such as resources and functions exposed by other threads and methods exposed by programming libraries. The computing environment must therefore manage the concurrent and/or cooperative operation of the threads comprising the program and other threads provided by other threads and by the operating system.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The execution of a thread may encounter a problem that causes the thread execution to encounter a protracted period of evaluation. This effect may be acceptable in some circumstances, but not in others. For instance, a first thread may be devised that interacts with a second thread in a protracted manner, such that the first thread may spend a long time waiting for the second thread to accomplish a result. This interaction may not cause a problem during ordinary execution of the threads, but may cause problems in a debugging context. A debugging technique (such as a breakpoint) may involve suspending the operation of both threads so that the user may perform certain operations, such as a function evaluation, which may involve executing a portion of a thread. This debugging technique may cause a problem if a function evaluation on the first thread, which is unsuspended in order to invoke the function evaluation, in turn invokes an operation on the second thread, which is suspended. The first thread may unexpectedly block for an indefinite period while awaiting the blocked second thread to return the results of the invocation. Thus, the first thread blocks indefinitely while performing the function evaluation. The debugger may also block while waiting for the results of the function evaluation; or the debugger may timeout while awaiting the results of the function evaluation due to the blocking of the first thread and attempt a forced abort of the first thread, which may corrupt the operation of the thread and invalidate the debugging process.

A technique for anticipating and avoiding the blocking of the first thread (which may be utilized, e.g., in the context of a debugging function evaluation) operating in a safe mode, wherein the blocking of a thread for a protracted period is unacceptable, involves preempting thread operations that have the capability of blocking the operation of the thread. The preemption relates to the invocation of service functions that may block the operation of the thread, such as a service function that involves unmanaged code, a service function that involves an interaction with a second thread, or a service function that is included on a list of programming library service functions that may block in some circumstances. The technique involves redirecting the references in the thread to service functions that have a blocking capability to an abort function, which may abort the thread. The aborting may be accomplished, e.g., by raising an exception indicating that the service function referenced by the thread cannot be invoked while the thread is executed in the safe mode (such as the debugging function evaluation) because the service function has the capability to block the thread.

This redirection may be applied during the execution of the thread to avoid some instances of thread blocking. While preparing to execute the thread in a safe mode, the computing environment may review the service functions invoked by the thread, and may redirect the service functions that are capable of blocking to an abort function. The thread may then be permitted to run; if the thread attempts to invoke the service function that might have blocked the thread, the thread is redirected to the abort function, which prevents the invocation of the problematic service function. In this manner, the thread may be executed in the safe mode with a reduced incidence of service function invocations that block the operation of the thread.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
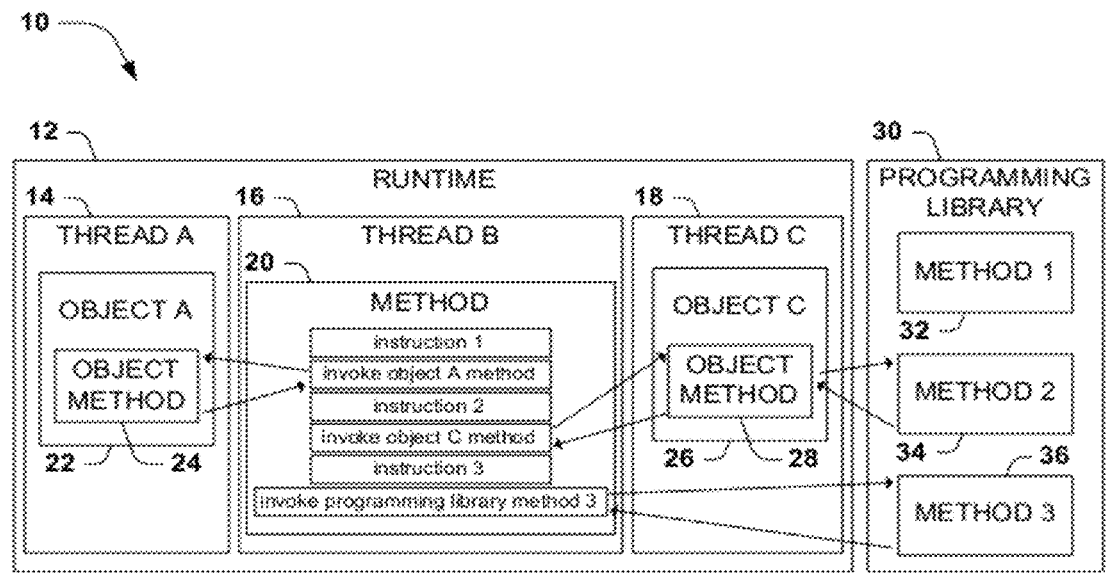
FIG. 1 is a component block diagram illustrating an exemplary set of interactions among threads and a programming library.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A multitasking computing environment manages the operation of executing programs and operating system processes, each comprising one or more threads of execution, where each thread performs a series of instructions in order to carry out a particular task. The instructions executed by each thread often involve references to resources stored outside of the thread, such as the members of an object hosted by another thread or the functions provided by a programming library, such as an application programming interface (API) that may be utilized by the thread to perform certain tasks (such as modifying the system registry) or to access certain resources (such as a graphics processor.)

A thread may execute within various contexts. In normal operation, a thread may proceed normally with a conservative set of monitoring and maintenance functions. In other contexts, a thread may operate with greater oversight and more stringent restrictions on the operations that may be performed. For example, a thread that is prone to raising memory access exceptions may be executed in a safe mode, whereby the memory accesses of the thread are more carefully analyzed to detect and prevent problems. A safe mode may be used, e.g., to execute the thread or a portion thereof within a function evaluation component of a debugger.

A thread may be hosted by a runtime, which is a module provided by the computing environment (e.g., as part of the operating system) to manage the execution of the thread, such as facilitating access to various resources (e.g., by providing memory management functions for allocating and accessing blocks of memory) and by safeguarding the operation of the thread against vulnerabilities and security exploits (e.g., by protecting memory accesses by the thread to prevent unintended or malicious references to other blocks of memory.) The instructions of a program that are to be managed by a runtime of the computing environment are often referred to as "managed" instructions, whereas instructions of a program that run more natively within the computing environment (e.g., machine-level instructions) are often referred to as "unmanaged" instructions. A runtime may therefore participate in the administration of managed instructions within a thread to achieve various ends. As one example, the runtime may facilitate the utilization of resources (such as the invocation of various methods) by participating in the references to such resources within the thread, such as by specifying the memory address of a service function exposed by a programming library so that the thread may invoke the service function.

FIG. 1 illustrates an example 10 of a runtime hosting various threads. The example 10 involves a runtime 12 that hosts a first thread 14, a second thread 16, and a third thread 18, and the computing environment is configured to run these three threads concurrently (e.g., in an interleaved manner through a context-switching thread scheduler, and/or by various processors in a multicore processor or a multiprocessing computing environment.) Thread B 16 comprises a method 20 comprising a series of instructions to be performed in sequence in order to achieve the task to which thread B 16 is directed. The instructions of the method 20 of thread B 16 reference some resources stored outside of thread B 16. For example, one instruction of the method 20 invokes an object method 24 in an object A 22 stored within thread A, and another instruction of the method 20 invokes an object method 28 in an object C 26 stored within thread C 18. A third instruction involves an interaction with a programming library 30, such as an application programming interface (API) provided by the operating system, which comprises a first method 32, a second method 34, and a third method 36. Moreover, each reference within the method 20 of thread B 16 to a resource outside of thread B 16 involves branching outside of the thread with various effects. As a first example, when thread B 16 invokes the object method 24 of object A 22, the invocation may involve the participation of thread A 14, such as in a message-passing arrangement where thread A 14 processes messages delivered by thread B 16 and provides a response. As a second example, when thread B 20 invokes the object method 28 of object C 26, object C 26 may in turn reference the second method 34 of the programming library 30 in order to complete the invocation. This invocation of the second method 34 of the programming library 30 may be explicit (e.g., where the object method 28 is documented as a wrapper for the second method 34) or opaque (e.g., where the object method 28 is simply documented as achieving some functionality, and does not state or suggest that the second method 34 is involved in the invocation of the object method 28.) For instance, the programming library may comprise a memory management module, such as a garbage collector process, and the invocation of the method 20 of thread B 16 may invoke a garbage collection phase that involves the participation of thread A 14 or thread C 18; this sequence of cooperative interactions may not be readily predictable from the invocation of the method 20 of claim B 16.

As illustrated by the execution of the method 20 of thread B 16 in FIG. 1, the instructions comprising a thread may involve a complex set of interactions with service functions in various programming libraries and with other threads. In some cases, these interactions may be protracted, such as where a first thread sends a synchronous request to a second thread that takes a while to process, and where the first thread cannot proceed until the second thread completes the processing of the request. For instance, when thread B 16 invokes the third method 36, the invocation of the third method 36 may not complete for an unexpectedly protracted period, and may unexpectedly block the operation of thread B 20. This protracted interaction may be acceptable in some contexts, such as the ordinary processing of the thread in a typical computing scenario. However, in other contexts, such protracted interaction may be undesirable and unacceptable. For example, the thread may be operating in a safe mode, which may monitor the operation of the thread more closely to examine resource utilization (such as memory allocation and deallocation), interactions with other threads and objects contained therein, and invocations of various programming libraries. One scenario involving such a safe mode is a debugging environment, where a user (such as a software developer) wishes to explore various aspects of the thread during its operation. For instance, a debugging tool may suspend all of the threads of an application prior to debugging one thread, such as by performing a function evaluation. However, if the thread targeted for debugging invokes an operation (such as a garbage collection phase) that depends on the participation of the other threads that have been suspended by the debugger, then the function evaluation may be indefinitely protracted in an unexpected manner, possibly causing the debugging tool or session to fail or crash. Another scenario involving such a safe mode is a secured environment, where a security application is configured to analyze a thread comprising an untrusted program for security threats, such as accesses to sensitive regions of memory. In safe mode environments, the analysis of the thread may be hampered by an unduly long processing time caused by the invocation by the thread of interest of service functions with long pendency.

One technique for mitigating the blocking of a thread by a service function invocation during a safe mode is to restrict the permissible duration of the invoked service function, such that if the pendency of a service function invocation exceeds a timeout value, the invocation is aborted. However, some service functions may not be easily aborted, and may be sensitive to mid-invocation termination. For instance, a service function may reserve some resources, such as system files to which the service function is writing, and an aborted invocation may leave such resources in an improper or incorrect state (e.g., locked files or inconsistent data stored in a database.) The result of such aborted service function invocations may include incorrect program operation, misused resources, and system crashes. Alternatively or additionally, the abort instruction may arise while a service function is performing some operations that cannot be aborted, such as a lengthy interaction with critical operating system files, and the analysis process may block or fail while attempting to abort the service function invocation.

An alternative technique for mitigating the blocking of a thread by a service function invocation during a safe mode is to preclude the invocation of service functions that may be capable of blocking. The set of service functions provided by an operating system may be analyzed to determine which service functions are capable of blocking (e.g., those that mediate an interaction between two threads, where one of the threads may be blocked, malfunctioning, etc.) and which service functions are probably not capable of blocking (e.g., a mathematics library service function for computing the logarithm of a floating-point value.) The invocations by the thread of the service functions that are capable of blocking may be precluded, while the invocations of the service functions that are not capable of blocking may be permitted. The preclusion may comprise (e.g.) the raising of an exception, which may indicate that the thread attempted to invoke a service function that is not permitted during safe mode due to the blocking capability of the service function.

This technique may be implemented by monitoring the service functions invoked by the thread and precluding the service functions having a blocking capability. However, this implementation might considerably reduce the performance of the computing environment, particularly where the thread invokes a great number of methods in a deeply nested and/or deeply recursive process. Moreover, this implementation may not be able to detect and preclude all such invocations. For instance, in the example 10 of FIG. 1, the second method 34 of the programming library 30 may comprise a blocking capability, and thread B 16 may be monitored to preclude the invocation of the second method 34. However, thread B 16 may invoke the second method 34 indirectly, such as by invoking a method 28 of an object 26 of thread C 18 that happens to involve the invocation of the second method 34 of the programming library 30. This indirect invocation may even be unintended or unknown to thread B 16, as the invocation of the second method 34 may be an undocumented aspect of thread C 18, and might only be detectable at runtime on a just-in-time basis. Alternatively, the precluded invocation by a thread of service methods having a blocking capability may be achieved by redirecting the service function references made available to the thread (e.g., by the runtime) that enable the thread to invoke the service functions. The runtime may redirect the service function references for service functions having a blocking capability to an abort function, which, instead of invoking the potentially problematic service function, simply aborts the analysis. Moreover, the redirection may be limited to safe mode circumstances, which may enable the thread to process normally (i.e., with full access to the potentially problematic service functions) during ordinary operation. In this manner, the thread may be permitted to run without monitoring, while also promoting the avoidance of blocking by service functions that are known, suspected, or detected to be capable of blocking the invoking thread.

Figure 2:
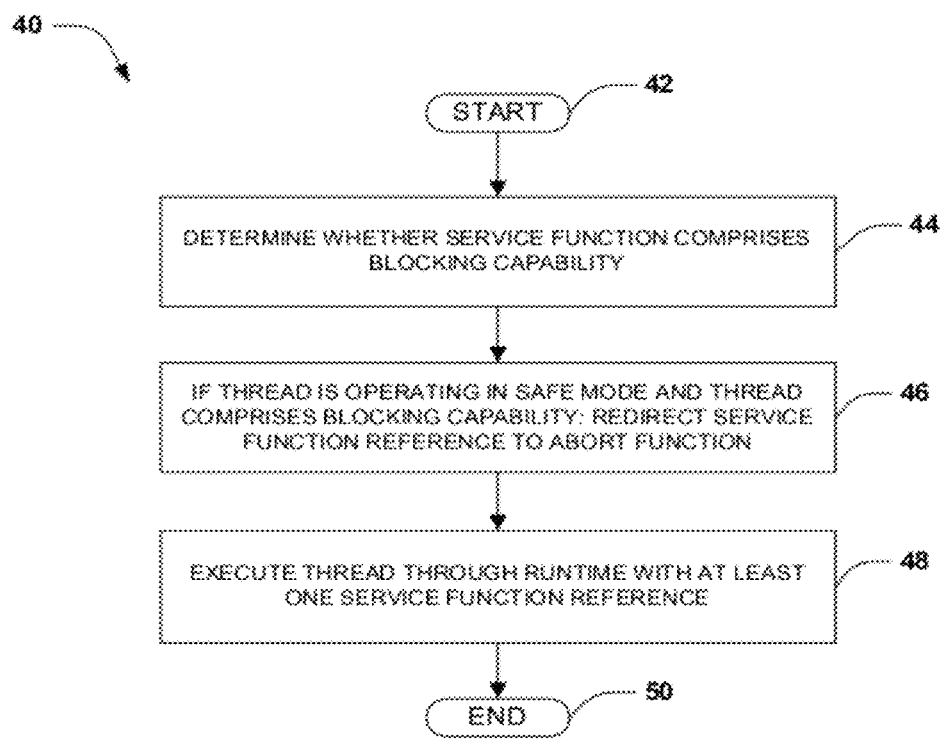
FIG. 2 is a flow diagram illustrating an exemplary method of executing a thread managed by a runtime having at least one service function reference to a service function.

FIG. 2 illustrates one embodiment of this technique, comprising an exemplary method 40 of executing a thread managed by a runtime having at least one service function reference to a service function. The exemplary method 40 begins at 42 and involves determining whether the service function comprises a blocking capability 44. If the thread is operating in a safe mode and the service function comprises a blocking capability, the exemplary method 40 also involves redirecting the at least one service function reference to an abort function 46. Regardless of whether the service function was redirected, the exemplary method 40 involves executing the thread through the runtime with the at least one service function reference. The thread so executed may process in ordinary circumstances unless the thread, while operating in a safe mode, attempts to invoke a service function having a blocking capability, in which case the thread is redirected to an abort function that precludes the invocation of the potentially problematic service function. Having redirected at least one potentially problematic service function to an abort function prior to running the thread in a safe mode, the exemplary method 40 thereby achieves the processing of the thread with a reduced incidence of blocking during service function invocations while operating in a safe mode, and therefore the exemplary method 40 ends at 50.

Figure 3:
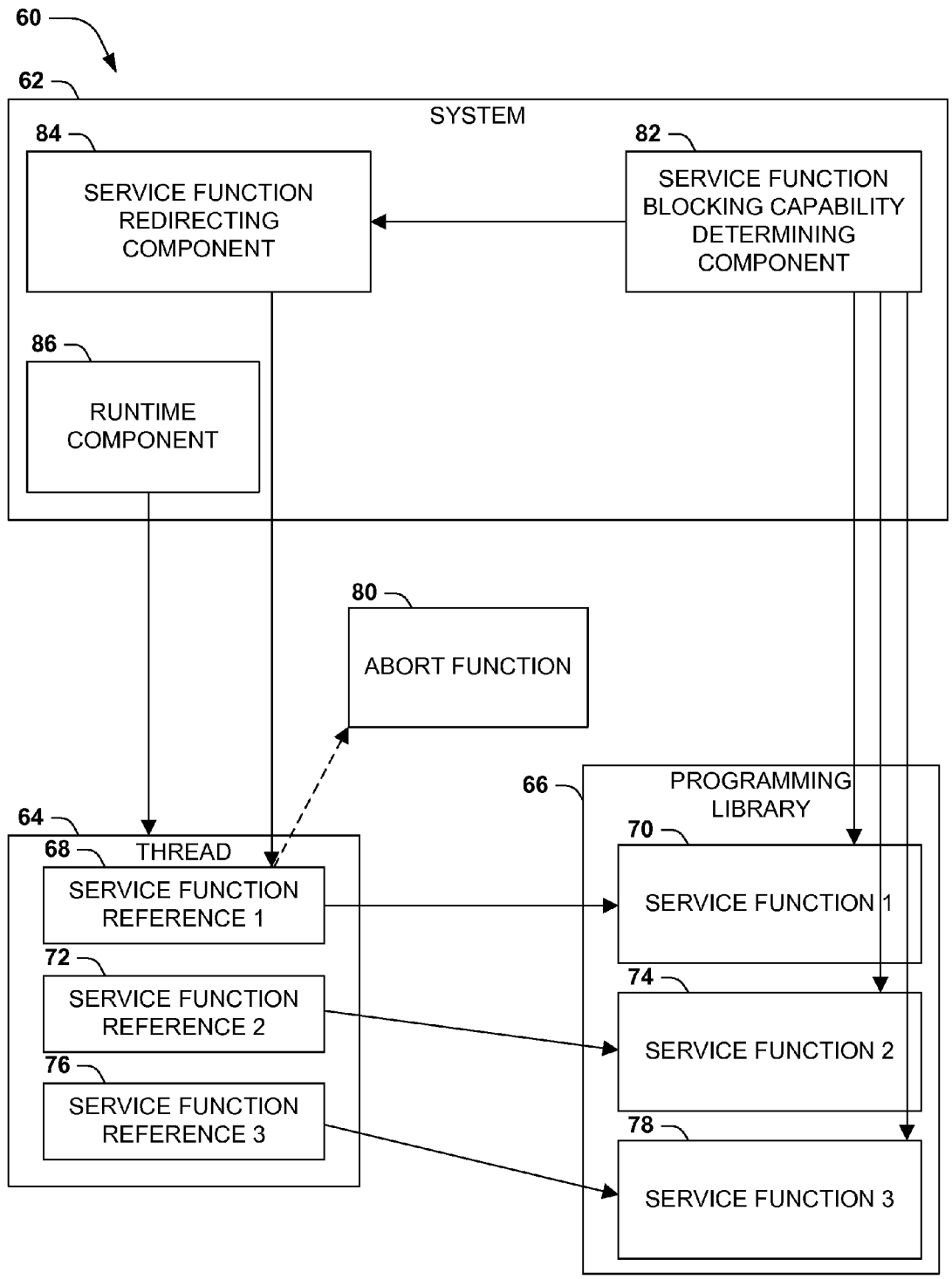
FIG. 3 is a component block diagram illustrating an exemplary system for executing a thread managed by a runtime having at least one service function reference to a service function.

FIG. 3 illustrated an example 60 of another embodiment of this technique, comprising an exemplary system 62 configured to execute a thread 64 having at least one service function reference to a service function. In this example 60, the thread 64 utilizes a programming library 66 through a first service function reference 68 to a first service function 70, a second service function reference 72 to a second service function 74, and a third service function reference 76 to a third service function 78. This exemplary system 62 operates in a computing environment specifying a mode of executing the thread 64, which may specify that the thread 64 is to be executed in a safe mode that may not be tolerant of protracted invocations of service functions. The computing environment also comprises an abort function 80, which is capable of aborting a service function invocation.

In furtherance of the operation of this computing environment, the exemplary system 62 of FIG. 3 comprises a service function blocking capability determining component 82, which is configured to determine whether a service function comprises a blocking capability. The exemplary system 62 also involves a service function redirecting component 84, which is operably coupled with the service function blocking capability determining component 84. The service function redirecting component 84 examines the service function references within the thread 64, and if the thread 64 is operating in a safe mode (as indicated by the computing environment) and the service function blocking capability determining component 82 indicates that the referenced service function comprises a blocking capability, then the service function redirecting component 84 redirects the service function reference of the thread 64 to the abort function 80. In this example 60, the service function blocking capability determining component 82 examines the first service function 70, the second service function 74, and the third service function 78, and determines that the first service function 70 may block, while the others are incapable or unlikely to block. The service function redirecting component 84 responds by checking whether the thread 64 is operating in safe mode, and if so, redirects the first service function reference 68 to the abort function 80. The second service function reference 72 and the third service function reference 76 are not redirected, as the referenced service functions do not block. The exemplary system 62 also comprises a runtime component 86 that executes the thread 64 with the service function references (regardless of whether or not the service function references have been redirected.) By redirecting potentially problematic service function references for the thread 64, the exemplary system 62 facilitates the execution of the thread 64 in a manner that reduces the incidence of blocking invocations of service functions during safe mode operation.

The techniques discussed herein may be implemented with variations in many aspects, and some variations may present additional advantages and/or mitigate disadvantages with respect to other variations of these and other techniques. These aspects and variations thereof may be applied within various embodiments of these techniques, such as (e.g.) the exemplary method 40 of FIG. 2 and the exemplary function 60 of FIG. 3.

A first aspect that may vary among implementations relates to the scenarios within which these techniques may be utilized, wherein the safeguards applied to the thread are adapted according to the techniques herein may be adjusted based on the anticipated usage scenario. For instance, the safe mode may comprise a debugging function evaluation mode, where the redirection is applied when the thread is the focus of a function evaluation through a debugging tool, and is not applied when the thread is executed in other contexts. The function evaluation might comprise (e.g.) an invocation of a method on an object managed by the thread, such that the thread is hijacked from its current context and redirected to perform another function and to return the result. The function might also comprise an inquiry as to the value of a primitive data type (e.g., a string, an integer, or a Boolean value) managed by the thread, or as to the value or status of a field or property of an object managed by the thread. In this context, the thread may be tasked with executing a debugging function evaluation, and the method may be configured to generate a debugging function evaluation result. This result may comprise either an aborted function result if the abort function is invoked by the thread during the debugging function evaluation (e.g., if the function cannot be evaluated due to a blocking capability in a method invoked during the evaluation), or a result of the debugging function evaluation if the abort function is not invoked by the thread during the debugging function evaluation.

Figure 4:
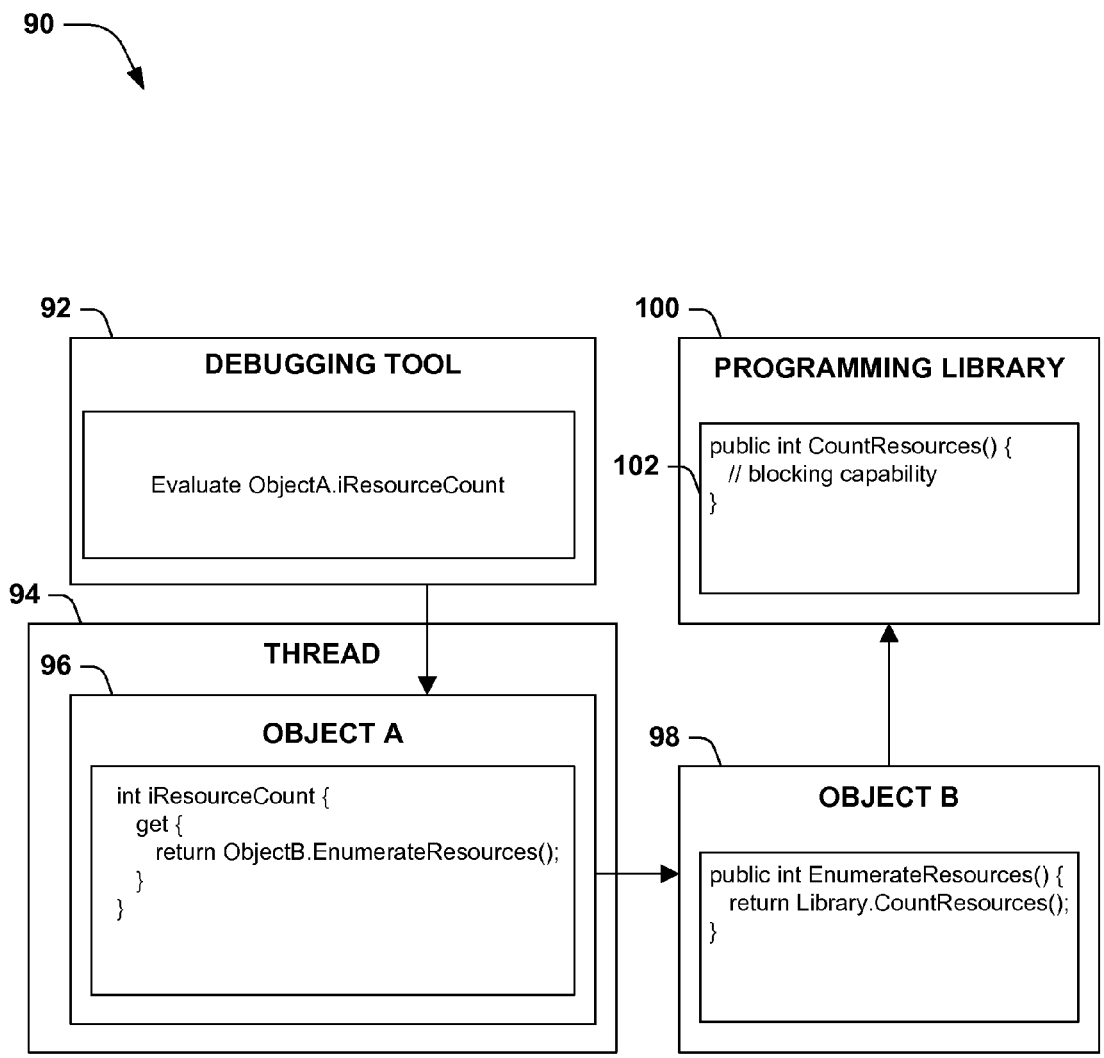
FIG. 4 is a component block diagram illustrating another exemplary set of interactions among threads and a programming library.

Even an inquiry into the value of an integer may lead to a function evaluation, e.g., where the value is associated by a get method that invokes another method that may block. FIG. 4 illustrates a scenario of a debugging function evaluation mode to which these techniques may be advantageously applied to avoid a potentially blocking function call that might otherwise be difficult to detect and avoid. In this example 90, a debugging tool 92 is applied to evaluate a thread 94, and specifically to evaluate a property of object A 96 managed by the thread 94. It may at first appear that the debugging tool 92 simply reads and produces the value stored in an integer field of object A 96, which is typically a straightforward inquiry with no capability of blocking. However, in this example 90, the integer of object A 96 is a value returned by a get method. This value is produced by querying a method of object B 98, which in turn invokes a service function 102 of a programming library 100 that happens to have a blocking capability. For instance, the programming library 100 may comprise a networked application library, and the service function may be an enumerator for a specific type of resources (e.g., the number of host processors available for performing a distributed task) that may take a long time to produce an answer (e.g., if the number of available computer systems that might have processors available for the distributed task is large.) Accordingly, the service function 102 provided by the programming library 100 might block, which might block the function of object B 98 invoked by the get method of object A 96. Accordingly, the simple debugging inquiry as to the value of an integer in this example 90 may lead to a blocking invocation, and the techniques presented herein may be applied to mitigate the blocking invocation and ensuing problems.

An additional variation of embodiments applied in the context of a debugging function evaluation relates to the manner of completing of the function evaluation, based on whether or not the invoked service function was completed or aborted due to a blocking capability. The debugging function evaluation may produce a result (e.g., the evaluated value of the integer), or may indicate the failure of the function evaluation due to a blocking capability of an invoked service function. Accordingly, embodiments of these techniques may conclude by generating a debugging function evaluation result, which may comprising an aborted function result if the abort function is invoked by the thread during the debugging function evaluation, or a result of the debugging function evaluation if the abort function is not invoked by the thread during the debugging function evaluation.

Another variation of the aspect relating to the scenario to which these techniques are applied involves a security context. For example, a computing system may host a variety of applications received from a variety of sources, e.g., some applications that were installed locally by a system administrator, and other applications that were downloaded from untrusted sources over the internet. The computer system may apply different sets of security to the threads comprising each type of application. Threads belonging to more heavily trusted applications may be executed with fewer restrictions, while threads belonging to less heavily trusted applications may be executed with more numerous restrictions. More specifically, less trusted threads may be executed in a safe mode that precludes protracted evaluation of service functions, which might be exploited by malicious applications (e.g., as a denial-of-service attack) by tying up the processor for an extended period or by maintaining threads that are difficult to abort. The techniques discussed herein may be utilized to restrict access by less trusted threads to potentially blocking service functions by redirecting such invocations to abort functions, while more trusted threads operating outside of the security-related safe mode may more freely invoke such service functions. Those of ordinary skill in the art may be able to devise many scenarios in which implementations may be utilized in accordance with the techniques discussed herein.

A second aspect that may vary among implementations of these techniques relates to the detection of the safe mode of the computing environment. An embodiment of these techniques may detect whether or not a thread is operating in a safe mode according to many variations. As one example, respective threads may comprise a safe mode indicator, such as a Boolean or enumerated indicator specifying various operating modes for the thread. Upon initiating a safe mode for the thread (e.g., upon instantiation of the thread, upon attaching a debugger to the thread, etc.), the computing environment may set the safe mode indicator for the thread. For instance, a system embodying these techniques (such as the exemplary system 62 of FIG. 3) may include a safe mode initiation component that is configured to set the safe mode indicator while initiating a safe mode for the thread. While investigating whether or not a thread is operating in a safe mode, the embodiment of these techniques may examine the safe mode indicator of the thread. As a second example, a mode indicator of this nature may be associated with a program, such as an executable binary or a program library, or with a process, to indicate that any threads spawned or owned thereby are to operate in a safe mode. The embodiment of these techniques may examine the safe mode thread associated with the executable binary, program library, or process to determine whether or not the thread is to be executed in a safe mode. As a third example, a mode indicator of this nature may be associated with one or more users (such as by associating such indicators with user accounts utilized by various users) to indicate that threads of execution utilized by these users are less trusted, the focus of debugging, etc., and are to be operated in a safe mode. As a fourth example, the computing environment may have one mode indicator to indicate whether all threads executed within the computing environment are to be operated in a safe mode. Those of ordinary skill in the art may be able to devise many ways of specifying the operating mode of a thread while implementing the techniques discussed herein.

A third aspect that may vary among implementations of these techniques relates to the identification of the blocking capability of a service function. It may be difficult to determine, on an ad hoc and just-in-time basis, whether a particular service function is capable of blocking (indeed, this is a classic NP-complete problem.) However, the service functions may be otherwise determined (such as by code analysis, simulations, parameter testing, etc.) as comprising or not comprising a blocking capability, and this information may be utilized in the techniques presented herein.

As one variation of this third aspect, an embodiment of these techniques (or the computing environment within which such an embodiment operates) may comprise a blocking capability service function list, which indicates, among the various service functions provided by the computing environment, which service functions are capable of blocking. The blocking capability service function list might identify service functions by name (e.g., "Function (x) in Programming Library (y)"), or more specifically by version number (e.g., "Function (x) in version (z) of Programming Library (y)"), or more generally by inclusion in a programming library (e.g., "any function in Programming Library (y)"), etc. The blocking capability service function list might also identify particular conditions under which such service functions might block (e.g., "Function (x) in Programming Library (y), if invoked with a numeric parameter greater than 100"). If the embodiment of these techniques may refer to a blocking capability service function list, then the embodiment may compare the service function references within the thread of interest with the service functions identified by the blocking capability service function list, and the determining may comprise locating the service function in the blocking capability service function list.

As a second variation of this third aspect, an embodiment of these techniques may determine the blocking capability of a service function by analyzing the service function according to one or more heuristics. For example, a heuristic that might be utilized in this context is a theory that unmanaged code is more likely to comprise a blocking capability than managed code, since unmanaged code is capable of accessing resources in a less restricted manner, and since unmanaged code is capable of accessing lower-level functionality (e.g., hardware, device drivers, memory, and critical operating system functions) in a less controlled manner. The execution of unmanaged code may therefore be identified as a blocking capability of a service function, and the determining utilized herein may comprise detecting an unmanaged code invocation by the service function. This invocation may comprise an invocation of a lower-level service function comprising unmanaged code, or the inclusion in the service function of an unmanaged code block that might block without easily achieved aborting. Accordingly, an embodiment of the techniques discussed herein might redirect to an abort function any service function references that reference service functions that invoke unmanaged code for any thread operating in a safe mode.

Another heuristic that may be utilized as a determination of a blocking capability involves a reference to a second thread, or to an object or property thereof managed by a second thread. This heuristic may be based on a theory that any type of reference by the thread of interest to another thread may lead to a blocking scenario. For instance, the second thread may comprise another thread in the same process or application that has been suspended by a debugging tool during debugging analysis, or that comprises an untrusted application running under restricted privileges (e.g., in a safe mode.) Accordingly, the determining utilized by an embodiment of these techniques may comprise detecting a reference by the thread to a member of a second thread, and any such reference may be redirected to the abort function if the thread is operating in a safe mode. The referencing of the second thread in this variation may be direct (e.g., a first thread invoking a service function provided by an object managed by a second thread) or indirect (e.g., a first thread invoking a service function of a programming library with reference to a second thread, e.g., an invocation of the "SendMessage" function of the computing environment to deliver a message to a second thread that may be suspended and unable to accept messages.)

Figure 5:
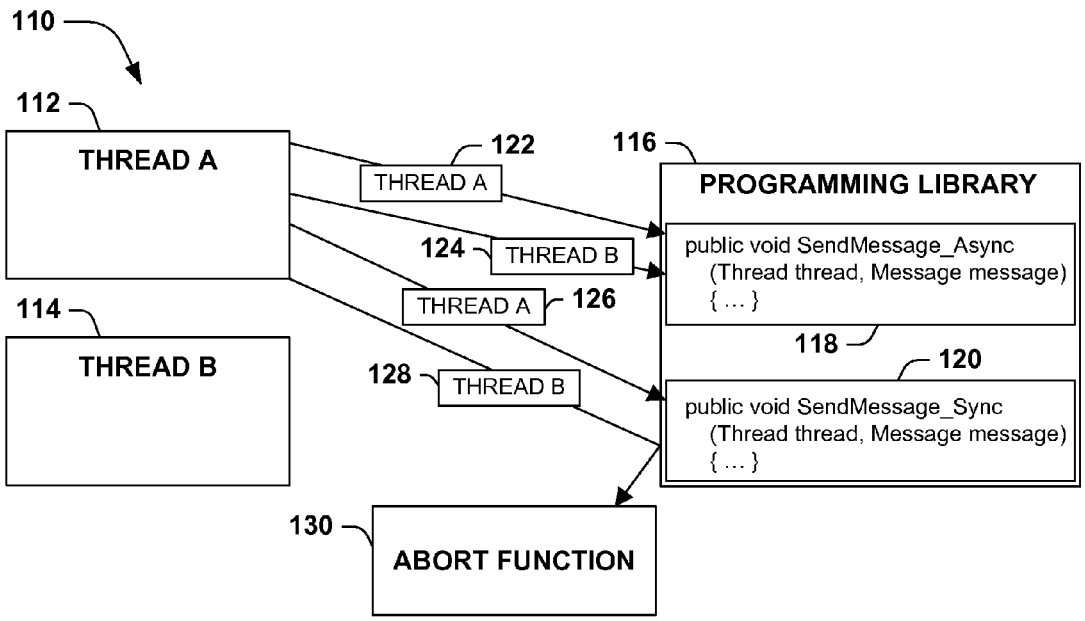
FIG. 5 is component block diagram illustrating yet another exemplary set of interactions among threads and a programming library.

A more detailed variation may apply analysis involving a consideration of the particular thread referenced. This variation may be useful where the invocation of a service function with a reference to a particular thread may comprise a blocking capability, whereas the invocation of the same service function with another thread may not comprise a blocking capability, and the invocation of another service function with the same thread may not comprise a blocking capability. FIG. 5 presents an example 110 of some invocations of service functions with references to various threads, wherein an embodiment of these techniques may assess the blocking capability of the invocation based on an analysis of both the service function invoked and the thread referenced in the invocation. This example 110 involves invocations by thread A 112 of a first service function 118 and a second service function 120 within a programming library 116. In this example 110, the programming library provides interprocess communication functions, and the first and second service functions provide (respectively) an asynchronous messaging function and a synchronous messaging function. The blocking capability of these service functions pertains to the nature of the messaging. If a message is sent synchronously (e.g., such that the sending thread is blocked until the receiving thread acknowledges receipt of the message), and if the receiving thread is blocked, then the sending thread also blocks until the receiving thread is unblocked, which may involve an indefinite blocking. However, if the sending thread sends the same message asynchronously (e.g., just queuing the message for delivery and then resuming execution even if the receiving thread does not receive the message), then the invocation is not likely to block. Moreover, if the sending thread is also the receiving thread—i.e., if the thread is sending a message to its own message queue, which the thread may periodically check (e.g., via a periodic timed interrupt)—then the invocation is likely to present no such blocking capability.

According to this example 110, thread A 112 issues four invocations of the service functions, and these invocations are handled differently based on the blocking capabilities respective to each invocation. The first invocation 122 involves an asynchronous message sent from thread A 112 to itself, which dose not comprise a blocking capability; accordingly, the invocation is effected through the first service function 118. The second invocation 124 involves an asynchronous message sent from thread A 112 to thread B 114, which may or may not be suspended, and which may or may not acknowledge the receipt of the message. However, since the sending is asynchronous, the service function invocation does not have a blocking capability, so the second invocation 124 is also effected through the first service function 118. The third invocation 126 involves the sending of a message from thread A 112 to itself in a synchronous manner. Since thread A 112 is definitely operational (as thread A 112 is the thread of execution upon which the techniques focus), the message pump for thread A 112 is presumably capable of receiving the synchronous message; accordingly, the third function invocation 126 is effected through the second service function 120. The fourth invocation 128, however, is differently processed. Because the fourth invocation 128 involves the synchronous transmission of a message from thread A 112 to thread B 114, which may be blocked or configured in such a manner as to withhold a prompt acknowledgment of the message, which may result in a block of thread A 112 in waiting for the second service function 120 to complete. Accordingly, the second service function 120 is determined to comprise a blocking capability for the fourth invocation 128. If thread A 112 is also found to be operating in a safe mode, then the fourth invocation 128 is redirected to an abort function 130, which aborts the invocation of the second service function 120. In this manner, thread A 112 is executed with a reduced incidence of blocking during service mode invocations while operating in a safe mode.

As an additional variation of embodiments wherein the nature of the thread and the interaction are evaluated in determining whether a service function invocation comprises a blocking capability, various threads may be identified as likely or unlikely to comprise a blocking capability. For example, the threads processed by the computing environment may comprise a blocking capability indicator that specifies the blocking capability of the thread. For instance, some threads may comprise more heavily trusted threads, such as system processes, and may be processed by the computing environment without being suspended, while less trusted threads, such as user threads or threads comprising untrusted applications, may be potentially suspended by the computing environment during processing. Accordingly, the more trusted threads may be indicated as less likely to block (e.g., if specified as a recipient of a message via a synchronous SendMessage invocation), while the less trusted threads may be indicated as more likely to block. An embodiment of these techniques may utilize this indicator to determine whether a service function invocation that specifies the thread may be capable of blocking, based on the additional information provided by the blocking capability indicator associated with the specified thread. Those of ordinary skill in the art may be able to devise many techniques for identifying blocking capabilities of invoked service functions while applying the techniques discussed herein.

A fourth aspect that may vary among implementations of these techniques relates to the abort function and the techniques for aborting the thread. As one example, the abort function may signal an abort of the service function invocation by raising an exception. The raised function may be propagated back to the thread to signal a failure of the service function invocation, to a process configured to analyze the thread (e.g., a debugging tool through which a function evaluation is being performed upon the thread), and/or to the computing environment for further handling, such as recording in a system exception log. In this context, it may be advantageous to load the abort function into the context of the thread, such that the exception is raised within the context of the thread for further handling therein. As another example, the abort function may less abruptly terminate the service function invocation, such as by returning a value indicating a failed service function invocation (e.g., a value of zero for a service function that returns nonzero integers upon successful invocations and zero for failed invocations), or simply by terminating the invocation and returning void or null. As a third example, the abort function may directly communicate with the computing environment or another process, such as a debugging tool, to communicate the failed invocation.

Figure 6:
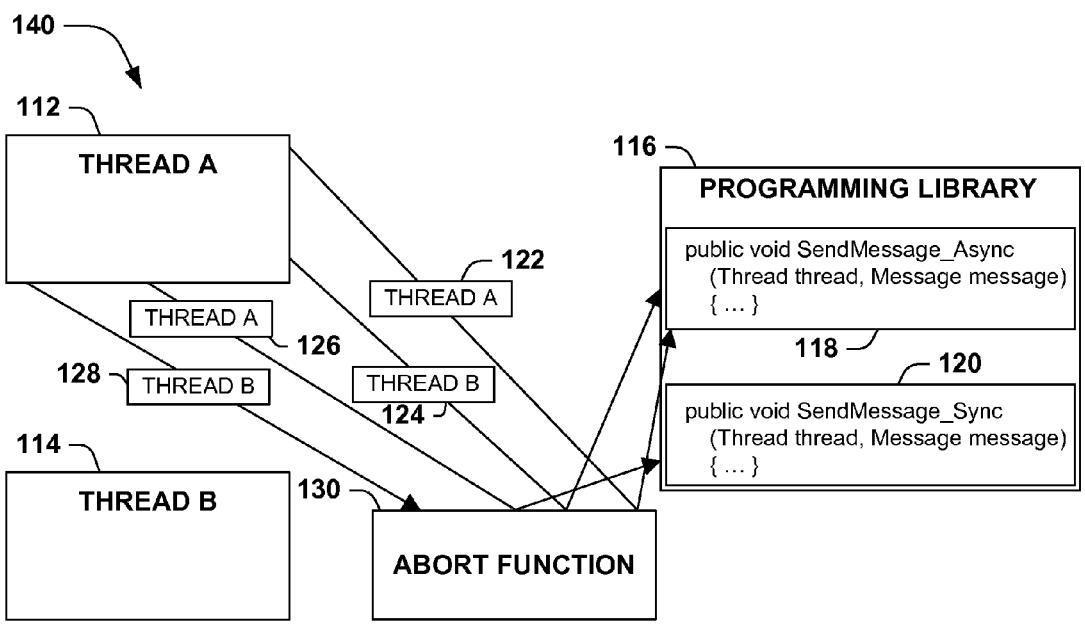
FIG. 6 is component block diagram illustrating yet another exemplary set of interactions among threads and a programming library.

The abort function may also be configured in many ways. As one example, the failure may be returned promptly, e.g., immediately upon invoking the abort function. As another example, the abort function may be configured to examine the circumstances of the service function invocation, to abort the service function invocation (such as by raising an exception) in certain circumstances, and to permit the service function invocation in other circumstances. In this embodiment, the abort function may be configured as a wrapper for the service function. In this embodiment, all service function invocations may be directed to the abort function, which may be configured to propagate permissible service function invocations to the respective service functions but to catch and abort impermissible service function invocations that may have a blocking capability. FIG. 6 presents an example 140 of this embodiment, illustrating the same interactions among thread A 112, thread B 114, and the programming library 116 as illustrated in FIG. 5, but wherein the abort function 130 has been configured to process service function invocations in this manner. The processing of such invocations is based on the same rationale described in relation to FIG. 5, but the alternative configuration of the abort function 130 produces a different process flow. In this example 140, the first invocation 122, the second invocation 124, and the third invocation 126 are routed through the abort function 130, but are then permitted as invocations of the respective service functions, while the fourth invocation 128 is also routed to the abort function 130 but is not propagated through to the second service function 120 in the programming library 116.

In embodiments such as illustrated in FIG. 6, the abort function 130 may be configured to determine the blocking capability of the service function invocation, and to abort the invocation or to invoke the service function according to the determined blocking capability. As one example, the abort function 130 may determine the blocking capability of the service function invocation based upon one or more heuristics, e.g., if the service function invocation involves a transition to unmanaged code, or if the thread invokes the service function with reference to the member of a second thread. The abort function may also determine the blocking capability of the service function invocation based upon a blocking capability service function list, and/or a detected value of a blocking capability indicator associated with a second thread referenced by the thread in the service function invocation. Those of ordinary skill in the art may be able to devise many advantageous configurations of the abort function while implementing the techniques discussed herein.

A fifth aspect that may vary among implementations of these techniques relates to the configuration of the system as a set of components. The factoring may be relevant in embodying portions of these techniques. For instance, the redirection of service function references may be difficult to perform, as this may be regarded as a security-sensitive operation that is ordinarily not permitted by the computing environment, due to the potential for exploitation and corruption of the computer system by malfunctioning or malicious code. Formulations of these embodiments (such as systems configured to operate as discussed herein) may be devised in view of this security aspect. As one example, a service function redirecting component (such as the service function redirecting component 84 in the exemplary system 62 of FIG. 3) may be formulated as two components that cooperate to redirect the service function reference to an abort function if the thread is operating in a safe mode and the service function comprises a blocking capability. The service function redirecting component may comprise an unmanaged redirecting component, which is generally configured to redirect a reference to a service function to a target function, and a managed redirecting component, which is configured to redirect the service function reference to the abort function by invoking the unmanaged redirecting component for the service function reference with a target function comprising the abort function. Accordingly, the redirection may be performed by the unmanaged redirecting component, which may be utilized by the managed redirecting component to redirect service function references to service functions that are determined to comprise a blocking capability. The managed redirecting component and the unmanaged redirecting component may therefore cooperate in achieving the redirection to reduce the incidence of blocking invocations of service calls by threads operating in a safe mode. Those of ordinary skill in the art may be able to devise many advantageous factorings of embodiments of the techniques discussed herein.

Figure 7:
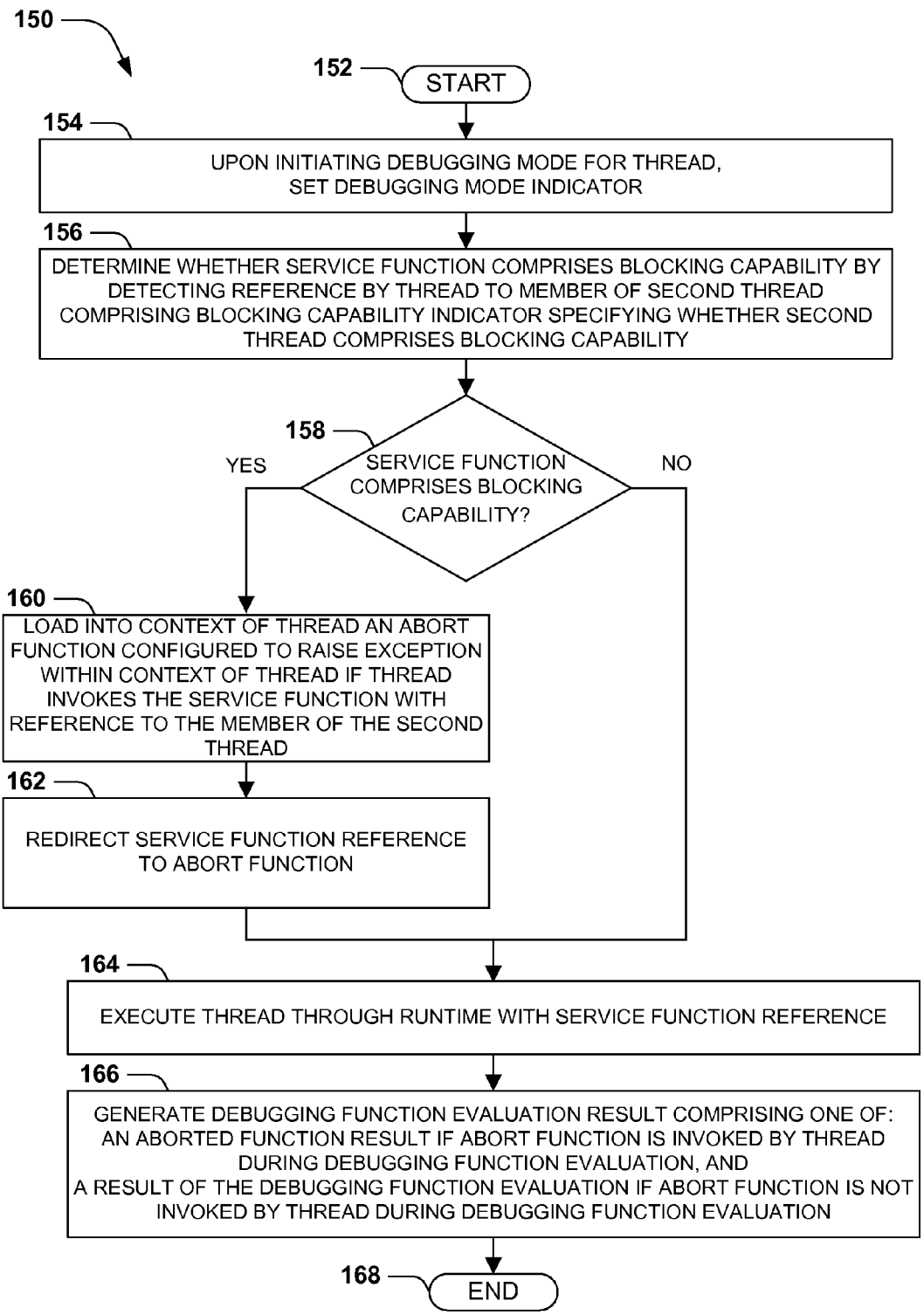
FIG. 7 is a flow diagram illustrating an exemplary method of executing a thread in a debugging mode wherein thread execution comprises a debugging function evaluation.

In view of these aspects and variations thereof, an embodiment may be devised that incorporates several such variations and presents several of the advantages and mitigates several of the disadvantages discussed herein. FIG. 7 illustrates one such embodiment, comprising an exemplary method 150 of executing a thread managed by a runtime and having at least one service function reference to a service function. This exemplary method 150 is directed to the execution of a thread operating in a debugging mode, wherein the thread execution comprises a debugging function evaluation, and wherein the thread comprises a debugging mode indicator specifying the debugging mode of the thread. The exemplary method 150 is therefore configured to facilitate the execution of the thread within this computing environment to mitigate the incidence of blocking invocations of service functions that may interfere with the debugging process.

Within this computing environment, the exemplary method 150 is configured in the following manner. The exemplary method 150 begins at 152 and involves setting the debugging mode indicator upon initiating the debugging mode for the thread 154. If the thread is not operating in the debugging mode, then the exemplary method 150 may omit the setting of the debugging mode indicator (or may actively clear the value of the debugging mode indicator.) The exemplary method 150 also involves determining whether the service function comprises a blocking capability by detecting a reference by the thread to a member of a second thread comprising a blocking capability indicator specifying whether the second thread comprises a blocking capability 156. The exemplary method 150 then branches at 158 based on whether or not the service function is determined to comprise a blocking capability. If the service function is determined to comprise a blocking capability, the exemplary method 150 involves loading into the context of the thread an abort function configured to raise an exception within the context of the thread if the thread invokes the service function with reference to the member of the second thread 160, and redirecting the at least one service function reference to the abort function 162. Whether or not the service function comprises a blocking capability, the exemplary method 150 involves executing the thread through the runtime with the at least one service function reference 164. The exemplary method 150 also involves generating a debugging function evaluation result 166. The debugging function evaluation result 166 may comprise one of an aborted function result if the abort function is invoked by the thread during the debugging function evaluation, and a result of the debugging function evaluation if the abort function is not invoked by the thread during the debugging function evaluation. Upon generating the debugging function evaluation result based on the invocation of the service function (and indicating whether or not the invoked service function was aborted), the exemplary method 150 completes the function evaluation of the thread, and so ends at 168.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or"

rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of executing a thread managed by a runtime having at least one service function reference to a service function and a blocking capability service function list, the method comprising:
   determining whether the service function is included in the blocking capability service function list indicating a blocking capability of the service function;
   if the thread is operating in a debugging function evaluation mode and the service function comprises a blocking capability, redirecting the at least one service function reference to an abort function;
   executing the thread through the runtime with the at least one service function reference; and
   generating a debugging function evaluation result selected from a debugging function evaluation result set comprising:
      an aborted function result if the abort function is invoked by the thread during the debugging function evaluation, and
      a result of the debugging function evaluation if the abort function is not invoked by the thread during the debugging function evaluation.

2. The method of claim 1, the abort function configured to raise an exception.

3. The method of claim 2:
   the abort function configured to raise the exception within the context of the thread, and
   the method comprising: loading the abort function into the context of the thread.

4. The method of claim 1, the determining further comprising:
   detecting an unmanaged code invocation by the service function.

5. The method of claim 1, the determining further comprising:
   detecting a reference by the thread to a member of a second thread.

6. The method of claim 5, the abort function configured to abort the service function invocation if the thread invokes the service function with reference to the member of the second thread.

7. The method of claim 5, the abort function configured to abort the service function invocation if the second thread comprises a blocking capability.

8. The method of claim 7:
   the second thread comprising a blocking capability indicator specifying the blocking capability of the second thread, and
   the determining comprising detecting the value of the blocking capability indicator of the second thread.

9. The method of claim 1:
   the thread comprising a debugging function evaluation mode indicator specifying the debugging function evaluation mode of the thread;
   the debugging function evaluation mode of the thread determined by the debugging function evaluation mode indicator; and
   the method comprising:
      upon initiating a debugging function evaluation mode for the thread, setting the debugging function evaluation mode indicator.

10. The method of claim 1:
    the debugging function evaluation mode associated with a debugger; and
    aborting the service function invocation comprising: notifying the debugger that the service function invocation was aborted.

11. The method of claim 1:
    the blocking capability service function list comprising at least one blocking condition under which the service function may comprise a blocking capability; and
    the redirecting comprising: if the thread is operating in a debugging function evaluation mode, the service function comprises a blocking capability, and the at least one blocking condition is satisfied, redirecting the at least one service function reference to an abort function.

12. A method of executing a thread managed by a runtime and having at least one service function reference to a service function, the thread operating in a debugging mode wherein thread execution comprises a debugging function evaluation, the thread comprising a debugging mode indicator specifying the debugging mode of the thread, and the method comprising:
    upon initiating the debugging mode for the thread, setting the debugging mode indicator;
    determining whether the service function comprises a blocking capability by detecting a reference by the thread to a member of a second thread comprising a blocking capability indicator specifying whether the second thread comprises a blocking capability;
    if the service function comprises a blocking capability:
       loading into the context of the thread an abort function configured to raise an exception within the context of the thread if the thread invokes the service function with reference to the member of the second thread, redirecting the at least one service function reference to the abort function;

executing the thread through the runtime with the at least one service function reference; and generating a debugging function evaluation result comprising one of:

an aborted function result if the abort function is invoked by the thread during the debugging function evaluation, and a result of the debugging function evaluation if the abort function is not invoked by the thread during the debugging function evaluation.

13. A method of executing a thread managed by a runtime having at least one service function reference to a service function and a blocking capability service function list, the method comprising:

determining whether the service function comprises a blocking capability of the service function by detecting a reference by the thread to a member of a second thread comprising a blocking capability indicator specifying a blocking capability of the second thread;

if the thread is operating in a debugging function evaluation mode and the service function comprises a blocking capability, redirecting the at least one service function reference to an abort function configured to abort the service function invocation if the thread references the member of the second thread;

executing the thread through the runtime with the at least one service function reference; and, generating a debugging function evaluation result selected from a debugging function evaluation result set comprising:

an aborted function result if the abort function is invoked by the thread during the debugging function evaluation, and a result of the debugging function evaluation if the abort function is not invoked by the thread during the debugging function evaluation.

14. The method of claim 13:

the abort function configured to raise an exception within the context of the thread, and the method comprising: loading the abort function into the context of the thread.

15. The method of claim 13, the determining further comprising locating the service function in a blocking capability service function list.

16. The method of claim 15:

the blocking capability service function list comprising at least one blocking condition under which the service function may comprise a blocking capability; and the redirecting comprising: if the thread is operating in a debugging function evaluation mode, the service function comprises a blocking capability, and the at least one blocking condition is satisfied, redirecting the at least one service function reference to an abort function.

17. The method of claim 13:

the thread comprising a debugging function evaluation mode indicator specifying the safe mode of the thread;

the debugging function evaluation mode of the thread determined by the debugging function evaluation mode indicator; and the method comprising:

upon initiating a debugging function evaluation mode for the thread, setting the debugging function evaluation mode indicator.

18. The method of claim 13, the determining further comprising: detecting an unmanaged code invocation by the service function.

19. The method of claim 13, the abort function further configured to abort the service function invocation if the thread invokes the service function with reference to the member of the second thread.

20. The method of claim 13:

the debugging function evaluation mode associated with a debugger; and aborting the service function invocation comprising: notifying the debugger that the service function invocation was aborted.

\* \* \* \* \*